United States Patent
Bayer

(10) Patent No.: US 7,420,357 B2
(45) Date of Patent: Sep. 2, 2008

(54) HYSTERETIC DC/DC CONVERTER

(75) Inventor: Erich Bayer, Thonhausen (DE)

(73) Assignee: Texas Instruments Deutschland GmbH, Freising (DE)

( * ) Notice: Subject to any disclaimer, the term of this patent is extended or adjusted under 35 U.S.C. 154(b) by 355 days.

(21) Appl. No.: 11/194,359

(22) Filed: Aug. 1, 2005

(65) Prior Publication Data

US 2006/0044174 A1    Mar. 2, 2006

(30) Foreign Application Priority Data

Jul. 30, 2004   (DE) ................. 10 2004 037 061

(51) Int. Cl.
*G05F 1/40*  (2006.01)

(52) U.S. Cl. .............. 323/283; 323/274; 323/284; 327/392

(58) Field of Classification Search ......... 323/273, 323/274, 282–284; 363/78, 95, 97; 327/392
See application file for complete search history.

(56) References Cited

U.S. PATENT DOCUMENTS

| | | | | |
|---|---|---|---|---|
| 5,399,958 | A * | 3/1995 | Iyoda ................. | 323/282 |
| 6,650,825 | B1 * | 11/2003 | Kitamura ............. | 386/46 |
| 6,791,306 | B2 * | 9/2004 | Walters et al. ......... | 323/288 |
| 6,903,912 | B2 * | 6/2005 | Kranister et al. ...... | 361/93.9 |
| 2002/0015319 | A1 * | 2/2002 | Hartular et al. ....... | 363/56.05 |

2004/0080962 A1   4/2004   Charych

FOREIGN PATENT DOCUMENTS

| | | |
|---|---|---|
| DE | 694 22 138 | 4/2000 |
| EP | 0 759 653 | 2/1997 |

OTHER PUBLICATIONS

TDA 16846 Data Sheet of Infineon Technologies, Version 1.3, Jul. 2003, pp. 1-28.

* cited by examiner

*Primary Examiner*—Jessica Han
*Assistant Examiner*—Emily Pham
(74) *Attorney, Agent, or Firm*—Warren L. Franz; Wade J. Brady, III; Frederick J. Telecky, Jr.

(57) ABSTRACT

A hysteretic DC/DC converter is proposed that operates at a high switching frequency without producing undesired pulse bursts at the output. The converter has a converter power stage with a supply voltage input, a controlled voltage output and an enable input. A comparator has a reference voltage input, a feedback input and an output, and a gating circuit connected between the output of the comparator and the enabling input of the converter power stage. The gating circuit inhibits as a function of load requirements the propagation of enabling pulses from the output of the comparator to the enabling input of the converter power stage. By gating the output of the comparator in a way to separate the output from the enabling input of the converter power stage immediately after the start of each conversion pulse, the generation of further pulses immediately after each conversion pulse is prevented, thereby keeping the output voltage ripple low.

4 Claims, 4 Drawing Sheets

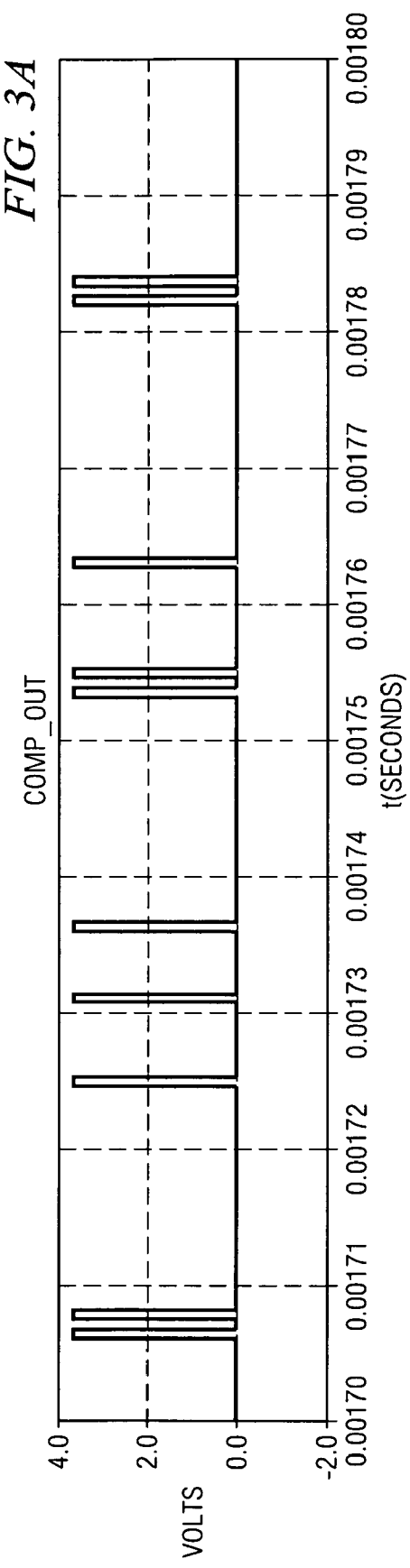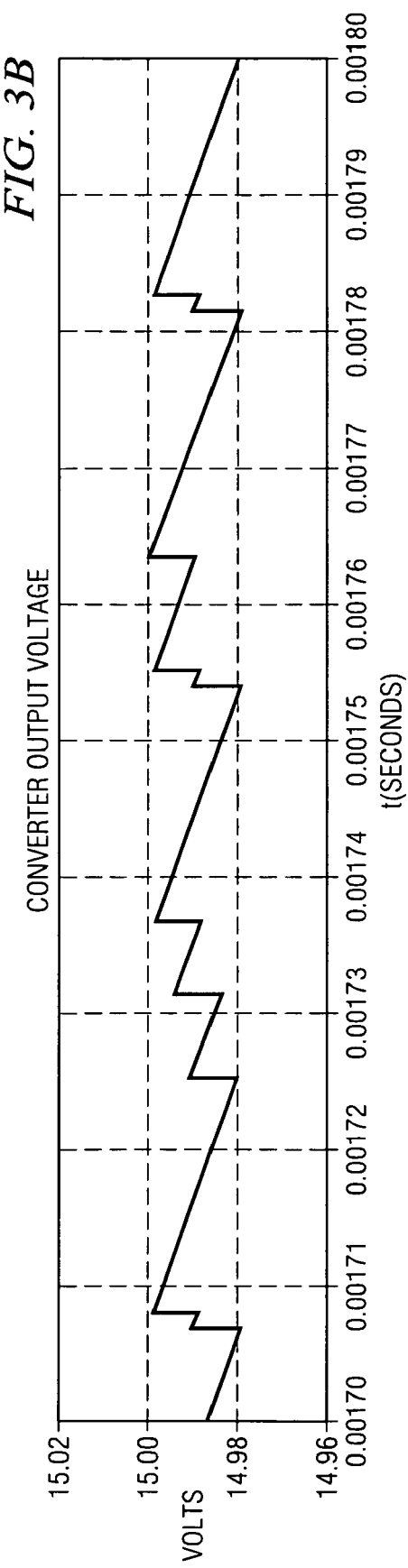

(ENABLE SIGNAL FOR CONVERTER OUTPUT STAGE)

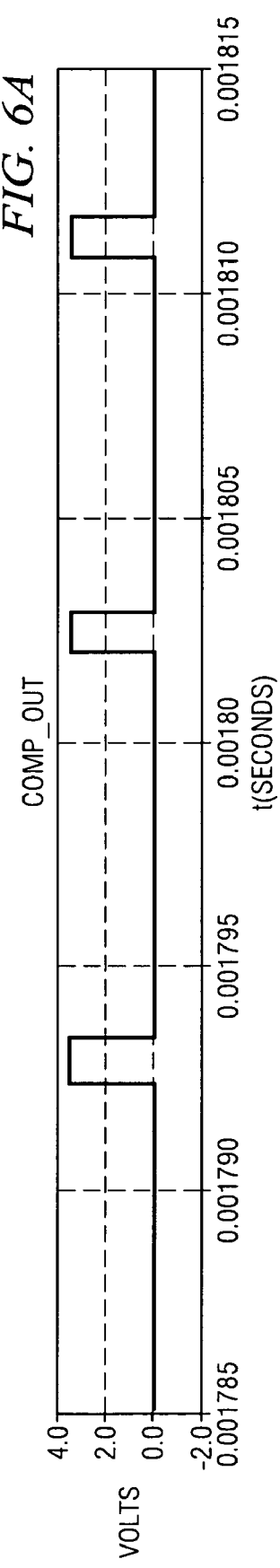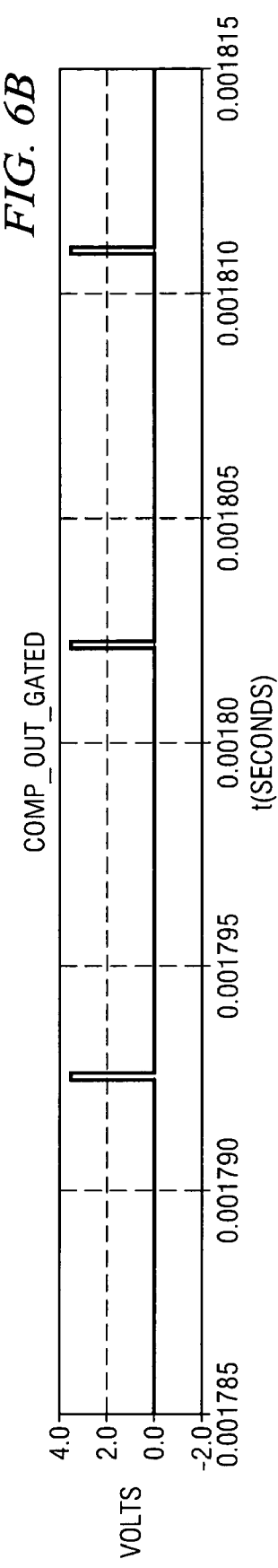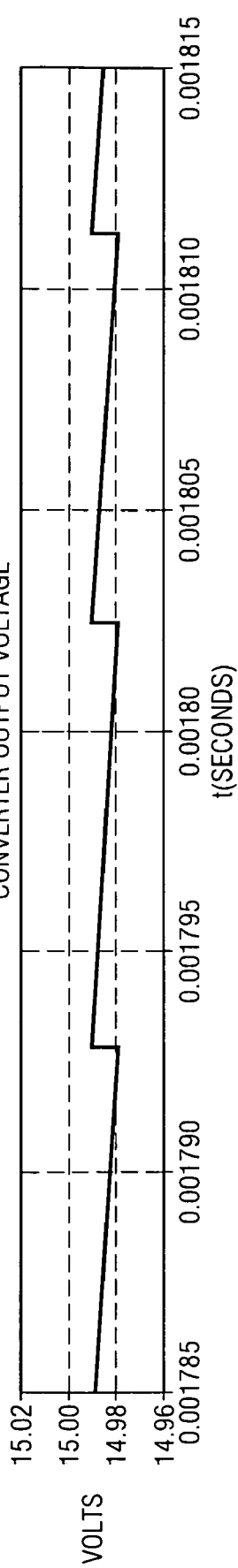

HYSTERETIC DC/DC CONVERTER

The present invention relates to a hysteretic DC/DC converter operating at a high switching frequency.

BACKGROUND OF THE INVENTION

A DC/DC converter has a comparator that compares a fraction of the output voltage of the converter with a reference voltage and applies an enable signal to the converter power stage when the output voltage is lower than the reference voltage. In response to the enable signal, the power stage of the converter supplies conversion pulses to a load. At high switching frequencies, the propagation delay of the comparator increases with decreasing input overdrive (the voltage difference between the positive and negative inputs). When the propagation delay becomes longer than the switching period, the converter can no more react in the same cycle, and an additional conversion pulse is produced. As a result, multiple conversion pulses (bursts) are produced instead of single pulses. This substantially increases the output voltage ripple. A rough calculation of the output voltage ripple shows that it cannot be smaller than the product of the comparator's overdrive voltage needed for a propagation delay equal to the switching period and the attenuation factor of the resistive divider at the output of the converter power stage:

$V_{ripple} > V_{(overdrive\ @\ tcycle)} *$ Attenuation factor.

The resistive voltage divider at the output of the converter power stage may have parasitic capacitances which introduce further delay in the feedback loop.

In addition, with inductive boost converters, a delay is produced inherently since energy is transferred to the output in the OFF period of the power stage (in the ON period, the inductor is charged). As a consequence, the output voltage will normally decrease during the first part if the conversion cycle (the ON period), and the comparator has a shorter time left to react.

These phenomena separately and in conjunction cause pulse bursts to occur at the output of the power stage instead of single pulses, thereby introducing output voltage ripple.

BRIEF SUMMARY OF THE INVENTION

The present invention provides a hysteretic DC/DC converter that operates at a high switching frequency without producing undesired pulse bursts at the output. Specifically, the converter has a converter power stage with a supply voltage input, a controlled voltage output and an enable input. A comparator has a reference voltage input, a feedback input and an output, and a gating circuit connected between the output of the comparator and the enabling input of the converter power stage. The gating circuit inhibits as a function of load requirements the propagation of enabling pulses from the output of the comparator to the enabling input of the converter power stage. By gating the output of the comparator in a way to separate the output from the enabling input of the converter power stage immediately after the start of each conversion pulse, the generation of further pulses immediately after each conversion pulse is prevented, thereby keeping the output voltage ripple low.

In a preferred embodiment, the gating circuit includes a gate and a monostable circuit, the gate having a first input connected to the output of the comparator, a second input connected to an output of the monostable circuit, and an output connected to the enable input of the converter power stage. The delay of the monostable circuit reliably determines the time span during which the output from the comparator is inhibited, i.e., prevented from being applied to the enable input of the power stage. Preferably, the monostable circuit has a trigger input connected to a feedback signal output of the converter power stage, the feedback signal from the feedback signal output having a first edge coincident with a starting current conversion pulse from the converter power stage and a second, opposite edge coincident with a terminating current conversion pulse from the converter power stage. This provides a precise timing of the gating operation.

In a further preferred embodiment, the monostable circuit has a variable delay time and a delay control input. The delay control input of the monostable circuit is connected to the output of the comparator through a low-pass filter. At the output of the low-pass filter, a signal indicative of the converter's output load is available. This signal is used to adjust the delay time of the monostable circuit in a closed feedback loop so that it remains shorter than time periods between successive current conversion pulses from the converter power stage under respective load conditions. In this way, the performance of the converter is optimized over a wide range of load conditions. Due to the low-pass filter characteristic of the feedback loop that defines the inhibit time, noise is filtered out in the feedback loop so that the delay time of the monostable circuit is controlled reliably.

BRIEF DESCRIPTION OF THE DRAWINGS

Further advantages and features of the invention will become apparent from the following description of a preferred embodiment with reference to the appending drawings. In the drawings:

FIGS. 3A and 3B illustrate a comparator output signal and a resulting output signal of the converter;

FIGS. 6A-6C illustrate the comparator output signal, a gated comparator output signal and a resulting output signal of the inventive converter.

DETAILED DESCRIPTION

Figure 1:
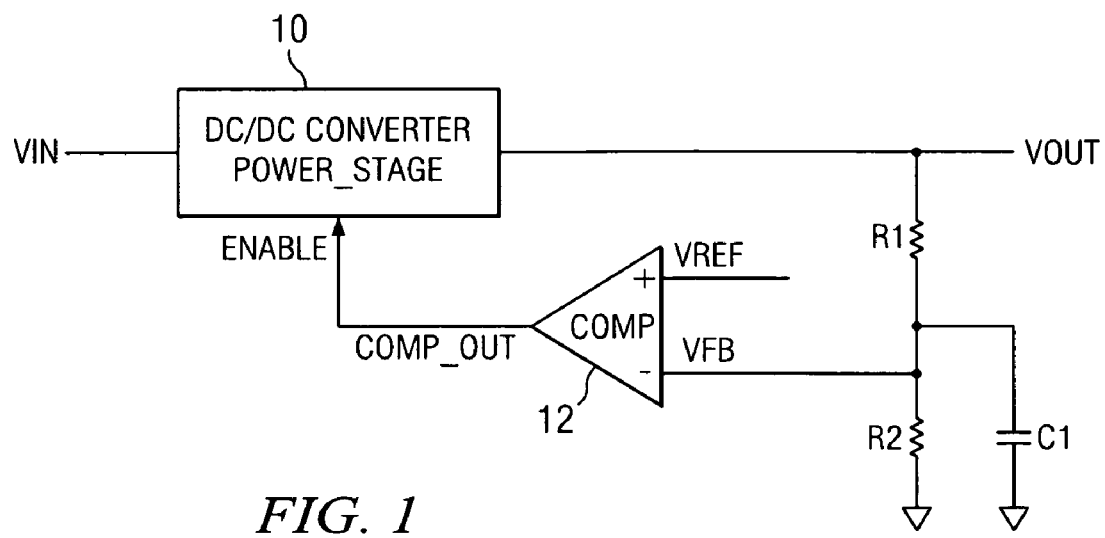
FIG. 1 is a block diagram of a convention DC/DC converter.

The conventional DC/DC power converter illustrated in FIG. 1 has a power stage 10 with a supply voltage input VIN, a controlled voltage output VOUT and an enable input ENABLE. A resistive voltage divider consisting of series-connected resistors R1 and R2 is connected between the output of power stage 10 and ground. A comparator 12 has a first input VFB connected to the node between resistors R1, R2 and receiving a feedback voltage, a second input VREF connected to a reference voltage source and an output COMP OUT connected to the ENABLE input of the power stage. The voltage divider inevitably includes a parasitic capacitor C1.

Figure 2:
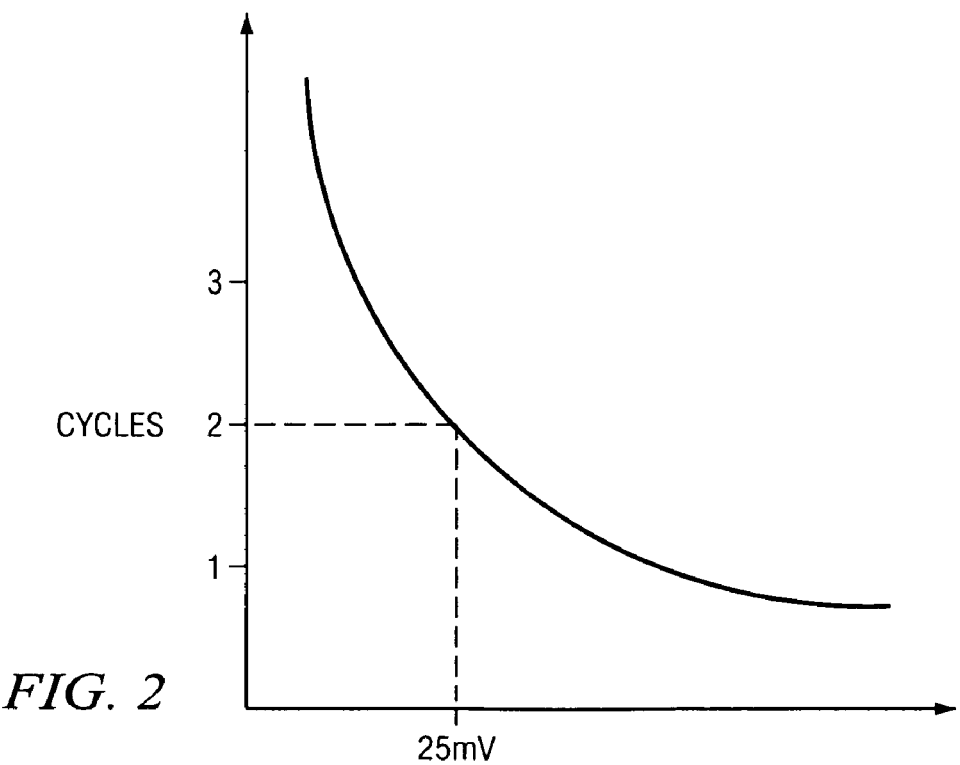
FIG. 2 is a chart illustrating the propagation delay versus the overdrive voltage of a comparator.

As seen in FIG. 2, the smaller is the comparator overdrive, i.e. the voltage difference between its differential inputs, the larger gets its propagation delay. For example, at high switching frequencies of the converter, an overdrive voltage of 25 mV may result in a propagation delay equal to two switching periods of the converter. It is thus understood that the comparator cannot react within the same cycle when the feedback voltage exceeds the reference voltage.

The resulting operation of the converter is illustrated in FIGS. 3A and 3B. In FIG. 3A, it is seen that the comparator output COMP_OUT, instead of producing single discrete enable pulses to the power stage, produces pulse bursts consisting of two or more pulses shortly following each other in the same switching period. Since the power stage produces a conversion pulse for each enabling pulse, the output voltage VOUT exhibits high ripple.

Figure 4:
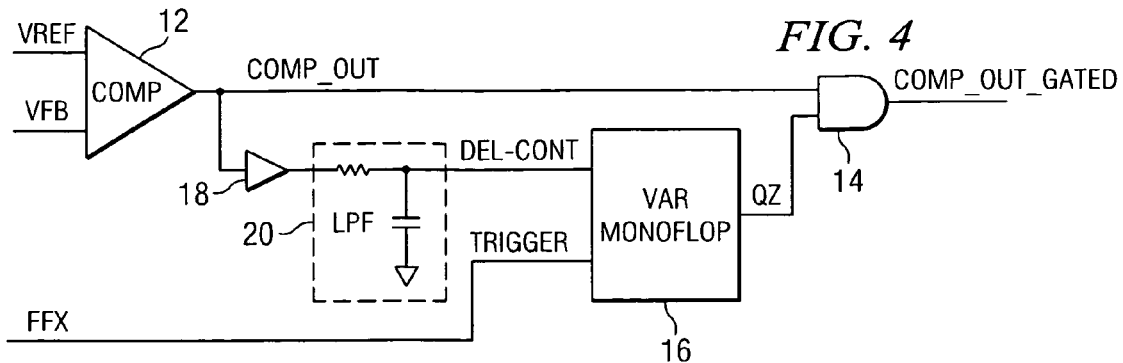
FIG. 4 is a block diagram of the inventive DC/DC converter.

With reference now to FIG. 4, the DC/DC converter of the invention includes a gate circuit 14 inserted between the output COMP OUT of the comparator 12 and the enable input of the power stage (not shown). Specifically, a first input of the gate circuit is connected to output COMP_OUT and a second input is connected to an output QZ of a monostable circuit 16. The latter has an output COMP_OUT GATED connected to the enable input of the power stage and a trigger input TRIG to which a feedback signal FFX from the power stage is applied. The monostable circuit 16 has a variable delay which is controlled at a delay control input DEL_CONT. The input to the latter is a signal indicative of the average load at the output of the converter. This signal is derived from the output COMP_OUT of comparator 12 with a low-pass filter circuit that includes a buffer 18 and a RC filter cell 20.

Figure 5:
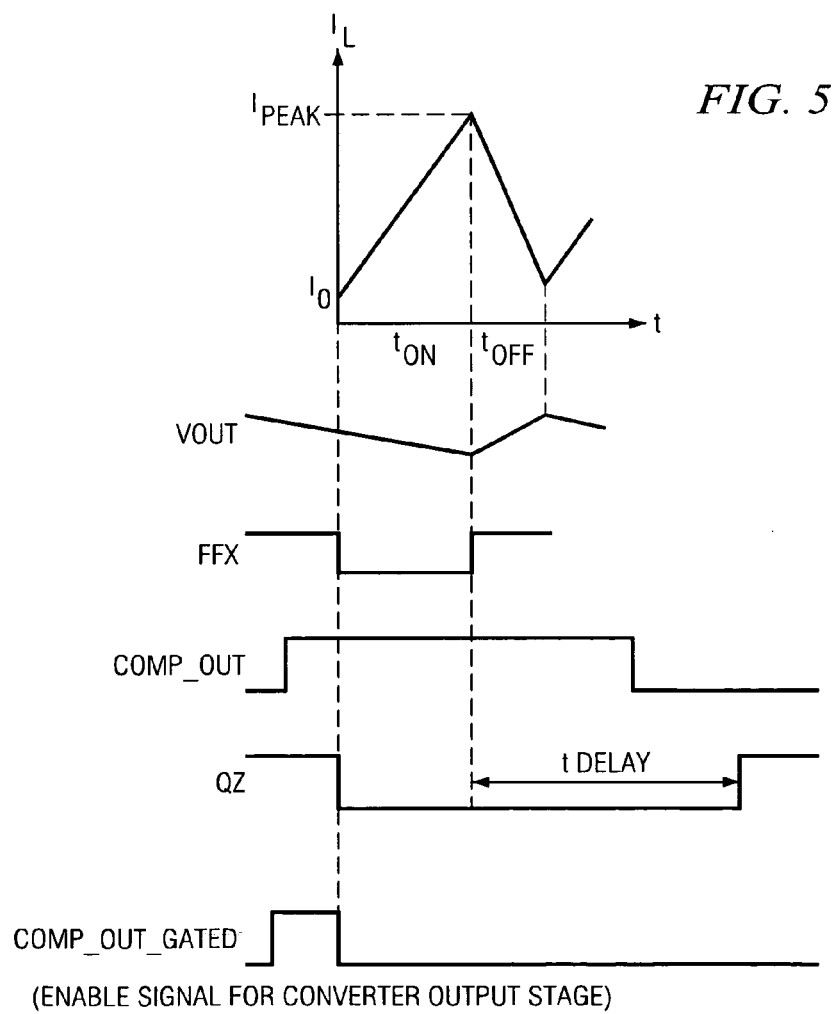
FIG. 5 illustrates signals (a)-(f) occurring in operation of the inventive converter.

In operation of the converter, which is assumed here to be an inductive DC/DC boost converter, a switching cycle consists of an ON period $t_{on}$ and an OFF period $t_{off}$. The inductor current $I_L$ is shown in FIG. 5 at (a). In the ON period, the inductor is loaded by a current rising from $I_0$ to a maximum of $I_{peak}$. In the OFF period, the inductor current falls to $I_0$, and energy is transferred to the output of the converter. The resulting output voltage VOUT is shown in FIG. 5 at (b). The feedback signal FFX, as seen in FIG. 5 at (c), has a falling edge coincident with the start of the ON period and a rising edge coincident with the start of the OFF period.

The output signal COMP OUT of the comparator 12 is high as long as the comparator senses the feedback voltage VFB to be lower than the reference voltage VREF. Actually, due to the propagation delay of the comparator at high switching frequencies and to parasitic capacitance in the feedback loop, and also due to the fact that the output voltage decreases when during the ON period, the output COMP_OUT of the comparator may remain high even when the output voltage VOUT already exceeds the target value. This is illustrated in FIG. 5 at (d).

As seen in FIG. 5 at (e), the monostable circuit 16 is triggered when at the start of the ON period. The output QZ inhibits gate circuit 14 so that the output of gate circuit 16 is gated as illustrated in FIG. 5 at (f). As a result, the power stage is enabled to produce a single conversion pulse.

The delay time $t_{Delay}$ of the monostable circuit 16 is adjusted in a feedback loop in accordance with the average load at the output of the converter. The power stage of the converter remains inhibited during the period where the output QZ of monostable circuit 16 is low, equal to the period where the feedback signal FFX is low plus the delay time $t_{Delay}$ of the monostable circuit 16. Since the inhibit time for the power stage is generated in a closed loop, a sufficient condition is that the minimum possible inhibit time generated by the monostable circuit should be shorter than the minimum distance between successive pulses generated by the power stage at the maximum load.

As seen in FIG. 6A, the comparator output COMP OUT consists of discrete single pulses, and FIG. 6B shows corresponding gated pulses at the output COMPOUT_GATED of the gate circuit 14. The resulting output voltage VOUT of the converter is shown in FIG. 6C. In comparison to the output voltage of the conventional converter as shown in FIG. 3B, the output voltage in FIG. 6C has a substantially reduced ripple.

The invention claimed is:

1. A hysteretic DC/DC converter for operating at a high switching frequency, comprising
    a converter power stage with a supply voltage input, a controlled voltage output and an enable input,
    a comparator with a reference voltage input, a feedback input and an output, and
    a gating circuit coupled between the output of the comparator and the enabling input of the converter power stage;
    the gating circuit being configured for inhibiting as a function of load requirements the propagation of enabling pulses from the output of the comparator to the enabling input of the converter power stage; the gating circuit including a gate and a monostable circuit; the gate having a first input connected to the output of the comparator, a second input connected to an output of the monostable circuit, and an output connected to the enable input of the converter power stage; the monostable circuit having a variable delay time and a delay control input; the delay time of the monostable circuit being adjusted in a closed feedback loop so that it remains shorter than time periods between successive current conversion pulses from the converter power stage under respective load conditions.

2. The converter according to claim 1, wherein the monostable circuit has a trigger input connected to a feedback signal output of the converter power stage, the feedback signal from the feedback signal output having a first edge coincident with a starting current conversion pulse from the converter power stage and a second, opposite edge coincident with a terminating current conversion pulse from the converter power stage.

3. The converter according to claim 1, wherein the delay control input of the monostable circuit is connected to the output of the comparator through a low-pass filter.

4. The converter according to claim 1, wherein the delay time is adjusted to provide a fixed period between successive conversion pulses.

* * * * *